(12) United States Patent
Baratta

(10) Patent No.: US 9,096,458 B2
(45) Date of Patent: Aug. 4, 2015

(54) ARTICLE MADE FROM OVERMOULDED COMPOSITE MATERIAL AND RELATIVE PREPARATION METHOD

(75) Inventor: Simone Baratta, Parma (IT)

(73) Assignee: BORMIOLILUIGI S.P.A., Parma (IL)

( * ) Notice: Subject to any disclaimer, the term of this patent is extended or adjusted under 35 U.S.C. 154(b) by 853 days.

(21) Appl. No.: 13/317,227

(22) Filed: Oct. 12, 2011

(65) Prior Publication Data
US 2012/0100329 A1    Apr. 26, 2012

(30) Foreign Application Priority Data
Oct. 19, 2010    (IT) .............................. MI2010A1909

(51) Int. Cl.
*B32B 3/00* (2006.01)
*B32B 1/08* (2006.01)
*A47G 19/22* (2006.01)
(Continued)

(52) U.S. Cl.
CPC ........... *C03C 3/087* (2013.01); *B29C 45/14434* (2013.01); *B65D 23/0835* (2013.01); *B65D 39/16* (2013.01); *C03C 3/095* (2013.01); *B29C 2045/14868* (2013.01); *B29K 2709/08* (2013.01);
(Continued)

(58) Field of Classification Search
CPC ............... B32B 1/00; A61J 1/00; A61J 1/06; A61J 9/00; B29C 45/14073; B29C 45/14778; B29C 45/14836; B29K 2709/08; B29L 2031/7158; C03C 3/093; C03C 3/087; C03C 3/091; C03C 3/062; C03C 3/078; C03C 3/122; C03C 3/17

USPC ........ 428/68, 156, 172, 426, 34.4, 34.6, 34.7, 428/36.9, 36.91; 215/12.1, 12.2; 501/66, 501/67; 264/259, 279, 271.1, 275, 328.1, 264/331.11
See application file for complete search history.

(56) References Cited

U.S. PATENT DOCUMENTS 4,133,923 A    1/1979    Blunt
4,260,438 A    4/1981    Dembicki et al.
(Continued)

FOREIGN PATENT DOCUMENTS

CN    101855143 A    10/2010
EP       2216257 A1 *  8/2010

OTHER PUBLICATIONS

European Search Report dated May 27, 2011.
(Continued)

*Primary Examiner* — Catherine A Simone
(74) *Attorney, Agent, or Firm* — Hedman & Costigan, P.C.; James V. Costigan; Kathleen A. Costigan

(57) ABSTRACT

An article made from overmolded composite material (1) having a glass body (2), consisting of a container or a closing element of a container, and an overmolded jacket (3) made from thermoplastic resin, characterised in that said glass (2) is a glass of the sodium-calcium or borosilicate type comprising (percentages in weight referring to the weight of the glass): CaO from 1 to 12% by weight, preferably between 8% and 10% in the case of sodium-calcium glass; preferably between 1% and 3% in the case of borosilicate glass; $Al_2O_3$ from 1 to 7% by weight, preferably between 1% and 2% in the case of sodium-calcium glass; preferably between 5% and 7% in the case of borosilicate glass; one or more oxides selected from the group consisting of ZnO, $TiO_2$ and $ZrO_2$.

18 Claims, 4 Drawing Sheets

(51) Int. Cl.
*B28B 21/00* (2006.01)
*B28B 11/00* (2006.01)
*B28B 21/72* (2006.01)
*B28B 23/08* (2006.01)
*B29D 22/00* (2006.01)
*B29D 23/00* (2006.01)
*F16L 9/10* (2006.01)
*B29B 7/00* (2006.01)
*B29C 45/00* (2006.01)
*C03C 3/087* (2006.01)
*B29C 45/14* (2006.01)
*B65D 23/08* (2006.01)
*B65D 39/16* (2006.01)
*C03C 3/095* (2006.01)
*B29K 709/08* (2006.01)
*B29L 31/00* (2006.01)

(52) U.S. Cl.
CPC .......... *B29L 2031/712* (2013.01); *Y10T 428/23* (2015.01)

(56) References Cited

U.S. PATENT DOCUMENTS

| | | |
|---|---|---|
| 4,421,580 A | 12/1983 | Dembicki et al. |
| 5,736,476 A | 4/1998 | Watzke et al. |
| 2002/0175136 A1 | 11/2002 | Bouix |
| 2006/0202388 A1 | 9/2006 | Dieudonat et al. |
| 2010/0252477 A1 | 10/2010 | Yamamoto |

OTHER PUBLICATIONS

Lehuede, et al. "Essais en Autoclave De Flacons De Verre A Usage Pharmaceutique", Analytica Chimica Acta. vol. 201, 1987 pp. 145-151.
Chinese Patent office Action dated Jan. 22, 2015.

* cited by examiner

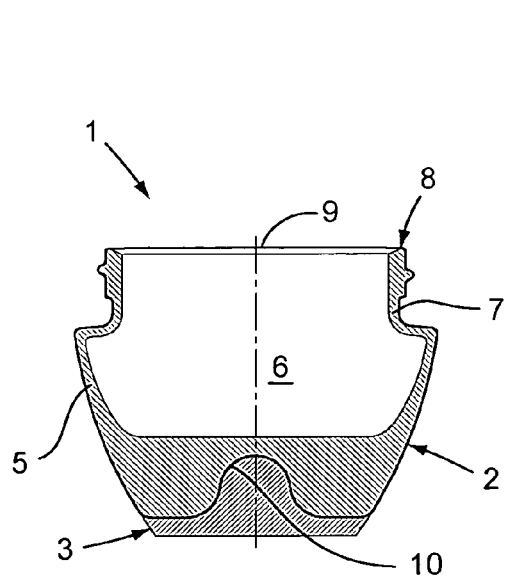
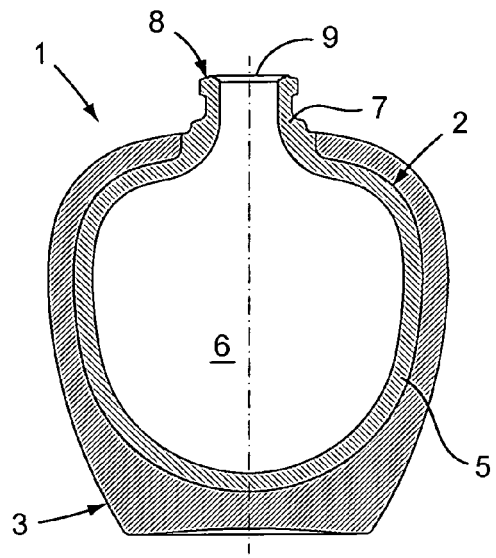
Fig. 9        Fig. 10
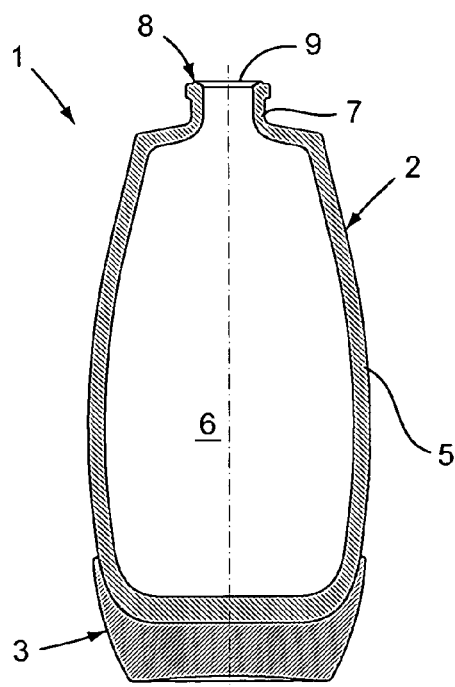
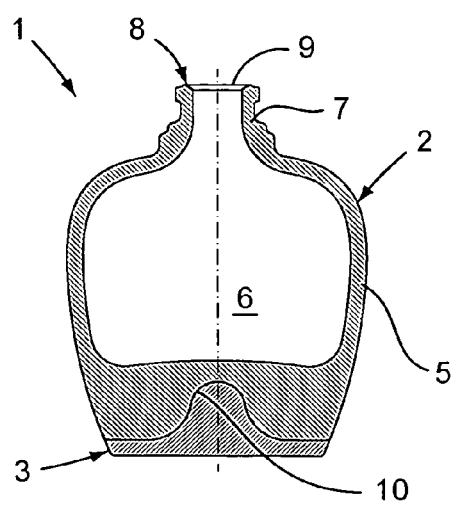
Fig. 11        Fig. 12

ARTICLE MADE FROM OVERMOULDED COMPOSITE MATERIAL AND RELATIVE PREPARATION METHOD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

1) Field of the Invention

The present invention concerns an article made from overmoulded composite material and the relative preparation method.

2) Description of Related Art

The present invention originates in the technical field of containers made from composite material intended to contain products of the cosmetic, pharmaceutical, food and perfume industry, or for example to be used as tableware.

In the field of containers made from composite material, in particular composite materials consisting of glass or transparent or semi-transparent thermoplastic resins, for some time it is has been known to use the technique of jacket through overmoulding of two or more layers of the same material (glass/glass or resin/resin overmoulding).

The technique of jacket is used mainly with the purpose of obtaining aesthetic effects.

The material used to form the jacket, for example, can have colour, light refraction index or other properties different from those of the material of the container subjected to overmoulding. By suitably varying the properties of the overmoulded materials it is possible to create numerous aesthetic effects capable of attracting the interest of the user with regard to the article and its content.

The jacket of a container can be total or partial: in the first case, the jacket entirely covers the recipient body, i.e. the portion of the container normally intended to receive the content; in the second case, the jacket only covers a portion of the recipient body.

The jacket is made through injection overmoulding processes or by pressing. Overmoulding processes distinguish themselves from functional coating processes in that the thickness of the material applied onto the overmoulded container is much greater than that generally applied as functional coating. Typically, a functional coating has a thickness of the order of a few micrometres, whereas a jacket applied by injection overmoulding has a thickness that can vary from 1 millimetre up to 1-2 centimetres. Moreover, the material applied as functional coating generally does not contribute to the exterior appearance of the surfaces on which it is applied.

Functional coatings are applied through dipping in suitable liquid coating compositions or through spraying or electro-spraying, spin coating, plasma, sol-gel, etc.

In the state of the art the jacket of a container is obtained through manual or automated processes.

An example of an automated industrial process for jacketing glass articles through overmoulding of thermoplastic resin is described in WO 02/094666 (WO'666). In particular, this document describes an overmoulding method suitable for making the jacket of glass or metal bottles with thin walls.

The method described in WO'666 and the products obtained with it have various drawbacks.

Firstly, the method is applicable exclusively to the overmoulding of glass articles in bottle form.

A second drawback is given by the fact that the layer of overmouldable resin has a minimum thickness equal to at least three times the minimum thickness of the walls of the glass container.

A third drawback is then linked to the overall weight of the article made from overmoulded composite material, which is lighter than a container made entirely from glass and having the same dimensions and shape. Although the reduction in weight has a favourable impact on the production and transportation costs of the finished articles, in the field of packaging of cosmetic and perfume products, however, the weight of the container is considered an important factor from the commercial point of view, since it has an influence on the perception of value of the content by the user.

The aforementioned drawbacks clearly limit the margins of creativity of those that design the aesthetic characteristics of these articles.

The overmoulding processes known in the prior art, such as that described in WO'666, can also have drawbacks concerning the reproducibility of the end product and the possible geometric shapes of the overmoulded containers. Indeed, the moulding is carried out using suitably shaped moulds, inside which the glass container is positioned. Inside the mould the container is subjected to the thrusting forces that the resin exerts on its walls and, therefore, it is easily subject to breaking. In order to at least partially avoid this problem, the state of the art is actually limited to overmould only glass containers having geometric shapes substantially without corners and/or with very rounded walls (typically containers shaped as solids of revolution), which can be produced in series with a smaller amount of waste due to the glass breaking in the injection step.

In line with these drawbacks of the state of the art, WO'666 also describes, as the preferred embodiment, overmoulding of glass containers having a substantially spherical shape.

The conditions at which it is possible to carry out overmoulding also have an influence over the characteristics of the jacket and, therefore, over the final appearance of the product. The thickness of the jacket that can be made through injection moulding, indeed, depends on the degree of fluidity of the resin and, therefore, on the temperature at which it is injected into the mould. In order to make low-thickness jackets it is necessary to have high-fluidity resins that can easily penetrate into the narrowest cavities of the mould. However, if the temperature of the resin is too high, its contact with the glass can damage it or even cause it to break. In WO'666 the injection temperature of the resin is within the range 120-160° C.

BRIEF SUMMARY OF THE INVENTION

The purpose of the present invention is to overcome the highlighted drawbacks of the state of the art.

A first object of the present invention is an article made from overmoulded composite material comprising a glass body, consisting of a container or a closing element of said container (i.e. a closure element, such as a stopper, able to be associated with a container), and an overmoulded jacket made from thermoplastic resin, characterised in that said glass is of the sodium-calcium or borosilicate type comprising (percentages in weight referring to the weight of the glass):

CaO from 1 to 12% by weight, preferably between 8% and 10% in the case of sodium-calcium glass; preferably between 1% and 3% in the case of borosilicate glass;

$Al_2O_3$ from 1 to 7% by weight, preferably between 1% and 2% in the case of sodium-calcium glass; preferably between 5% and 7% in the case of borosilicate glass;

one or more oxides selected from the group consisting of ZnO, $TiO_2$ and $ZrO_2$, in a variable amount from 0.3 to 3% by weight of each oxide.

A second object of the present invention is a method for making an article made from overmoulded composite material comprising a glass body, consisting of a container or a closing element of said container, and an overmoulded jacket made from thermoplastic resin, said method comprising the following steps:

a) positioning said glass body in a cavity of a mould;
b) injecting a thermoplastic resin into said mould, said method being characterised in that said glass is of the sodium-calcium or borosilicate type comprising (percentages in weight referring to the weight of the glass):

CaO from 1 to 12% by weight, preferably between 8% and 10% in the case of sodium-calcium glass; preferably between 1% and 3% in the case of borosilicate glass;

$Al_2O_3$ from 1 to 7% by weight, preferably between 1% and 2% in the case of sodium-calcium glass; preferably between 5% and 7% in the case of borosilicate glass;

one or more oxides selected from the group consisting of ZnO, $TiO_2$ and $ZrO_2$, in a variable amount from 0.3 to 3% by weight of each oxide.

A further object of the present invention is a glass of the sodium-calcium or borosilicate type comprising (percentages in weight referring to the weight of the glass):

CaO from 1 to 12% by weight, preferably between 8% and 10% in the case of sodium-calcium glass; preferably between 1% and 3% in the case of borosilicate glass;

$Al_2O_3$ from 1 to 7% by weight, preferably between 1% and 2% in the case of sodium-calcium glass; preferably between 5% and 7% in the case of borosilicate glass;

one or more oxides selected from the group consisting of ZnO, $TiO_2$ and $ZrO_2$, in a variable amount from 0.3 to 3% by weight of each oxide.

The Applicant has surprisingly found that by using glass containers having the particular chemical composition indicated above it is possible to obtain articles overmoulded with thermoplastic resins having innovative characteristics with respect to articles known in the state of the art. In particular, it is possible to overmould the aforementioned glass containers in a wider variety of geometric shapes, thus widening the field of application of the jacketing technique for the creation of articles made from overmoulded composite material of particular aesthetic value and/or with high resistance to breaking.

The articles made from overmoulded composite material object of the present invention are particularly suitable for the packaging of perfume, cosmetic, pharmaceutical and food products and as tableware, such as glasses, goblets, cups and jars. The glass surface, indeed, makes the articles of the present invention compatible with contact with most solid and liquid substances, in particular solvents.

BRIEF DESCRIPTION OF THE SEVERAL VIEWS OF THE DRAWINGS

In order to better understand the characteristics of the present invention, in the description we will refer to the following figures:

FIG. 9 shows a sectional view of an alternative embodiment of the article made from overmoulded composite material of FIG. 8;

FIG. 10 shows a sectional view of an alternative embodiment of the article made from overmoulded composite material of FIG. 6;

FIG. 11 shows a sectional view of an alternative embodiment of the article made from overmoulded composite material of FIG. 6;

FIG. 12 shows a sectional view of an alternative embodiment of the article made from overmoulded composite material of FIG. 6;

DETAILED DESCRIPTION OF THE INVENTION

Figure 1:
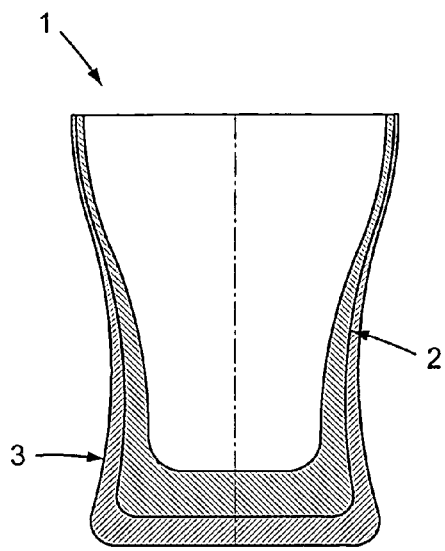
FIG. 1 shows a sectional view of an article made from overmoulded composite material in which the glass body is shaped like a glass.
Figure 2:
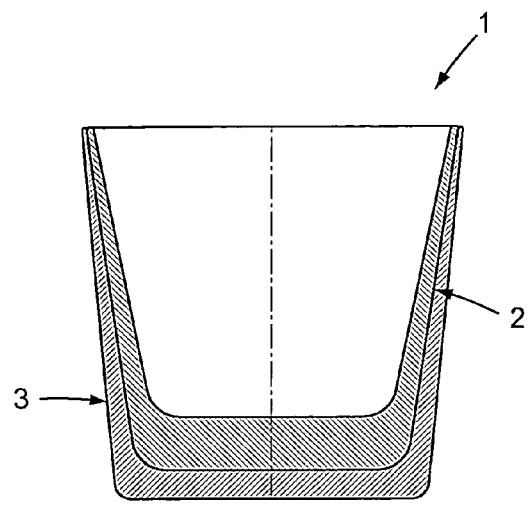
FIG. 2 shows a sectional view of an alternative embodiment of the article made from overmoulded composite material of FIG. 1.
Figure 3:
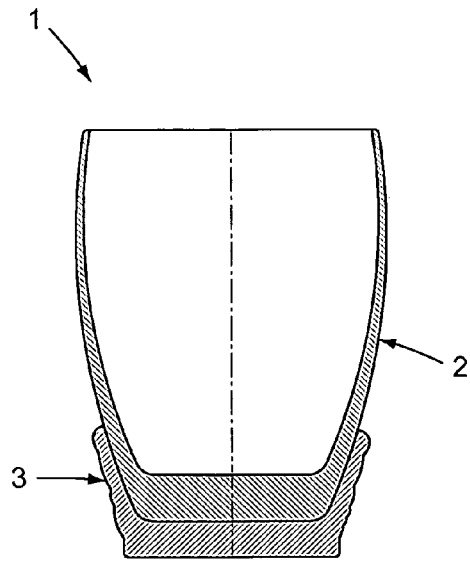
FIG. 3 shows a sectional view of an alternative embodiment of the article made from overmoulded composite material of FIG. 1.

With reference to the figures, the article made from overmoulded composite material (1) in accordance with the present invention comprises a glass body (2) and a jacket (3) overmoulded on the surface of the glass body (2).

The glass body (2) can be a hollow glass body (container) or a full glass body (for example a stopper).

In accordance with the present invention, the glass body (2) is made with a glass of the sodium-calcium or borosilicate type comprising (percentages in weight referring to the weight of the glass):

CaO from 1 to 12% by weight, preferably between 8% and 10% in the case of sodium-calcium glass; preferably between 1% and 3% in the case of borosilicate glass;

$Al_2O_3$ from 1 to 7% by weight, preferably between 1% and 2% in the case of sodium-calcium glass; preferably between 5% and 7% in the case of borosilicate glass;

one or more oxides selected from the group consisting of ZnO, $TiO_2$ and $ZrO_2$, in a variable amount from 0.3 to 3% by weight of each oxide.

Preferably, the aforementioned glass comprises ZnO in a variable amount between 0.5% and 2% by weight and/or $TiO_2$ in a variable amount between 0.5% and 2% and/or $ZrO_2$ in a variable amount between 0.3% and 1%.

As known to the man skilled in the art, a sodium-calcium glass is defined as a glass containing at least $SiO_2$, $Na_2O$ and CaO as main vitrifying components. Generally, $SiO_2$ is present in a variable amount from 71% to 73% by weight, whereas $Na_2O$ is in a variable amount from 12% to 14% by weight.

As known to the man skilled in the art, a borosilicate glass is a glass containing at least $SiO_2$ and $B_2O_3$ as main vitrifying components. Generally, $SiO_2$ is present in a variable amount from 60% to 62% by weight, whereas $B_2O_3$ is in a variable amount from 7% to 11% by weight.

In accordance with the present invention, sodium-calcium and borosilicate glass also possess the following characteristics.

Sodium-calcium glass also contains MgO in a variable amount from 1 to 5% by weight, preferably between 1% and 3%.

In borosilicate glass MgO can be present in a variable amount from 0% to 1% by weight.

In borosilicate glass there is also $B_2O_3$ from 5 to 12% by weight, preferably in a variable amount between 8% and 12%.

The $B_2O_3$ oxide can optionally be added to sodium-calcium glass up to a maximum quantity equal to 5% by weight, preferably between 1% and 3% by weight, to reduce its thermal dilation coefficient.

The aforementioned composition makes the glass very stable in chemical terms during all of the processing steps of the glass body (2) to obtain the article made from overmoulded composite material (1). In particular, the aforementioned composition prevents the degradation of the surface of the glass over time and the appearance on the surface of alkaline substances, thus promoting the interaction with the thermoplastic resin during overmoulding. In particular, the absence of appearance on the surface of alkaline substances, such as calcium carbonate deposits, makes it possible to keep the original composition of the surface of the glass unchanged, reinforcing the chemical interaction thereof with the free hydroxyl groups of the thermoplastic resin. Moreover, thanks in particular to the presence of ZnO and/or $B_2O_3$ in the ratios indicated above, the glass is characterised by a lower thermal dilation coefficient and, consequently, a higher resistance to thermal shocks with respect to glass used for overmoulding in the state of the art.

In order to avoid the appearance on the surface of alkaline compounds, before overmoulding, the glass bodies can be subjected to surface treatments, such as the application of coatings based on difluoroethane, aluminium trichloride or tin chloride or a hot sulfuration treatment.

Another characteristic that makes the glass described above particularly suitable for overmoulding is its particular mechanical strength, which derives from the ability of the aforementioned oxides to harden the surface of the glass.

Preferably, the glass used for the purposes of the present invention has an iron oxides content of less than 140 ppm. The absence of iron oxides does, indeed, improve the optical properties of glass, in particular its transparency. Preferably, the glass used for overmoulding is a glass type "Ultra Clear" in accordance with standard ISO/PAS IWA 8:2009.

The glass according to the present invention can also comprise decolourant additives like Se, CoO, $Er_2O_3$, CeO and nitrates to control chromaticity.

The mechanical strength of the glass can be further increased by subjecting the finished glass bodies, before the overmoulding method, to hot deposition treatments of $Al_2O_3$, $SnO_2$ or $TiO_2$, according to techniques of the prior art, with formation of a transparent coating layer with a protective function.

Another provision that can be made to increase the mechanical strength of the glass is to subject the surface of the glass body (2), before overmoulding, to a fire polishing treatment, with which it is possible to hot weld the surface imperfections present on the glass body (2) that constitute the initiation point of possible breaking following knocks or torsional stresses.

A further reinforcement of the mechanical strength of the glass can be obtained by subjecting the glass bodies to be overmoulded to chemical or thermal tempering processes.

The glass body (2) can be made in different shapes, sizes and colours, using the techniques and apparatuses known to the man skilled in the art. Considering the fact that the best aesthetic effects are obtained on glass with homogeneous composition, it is preferable that in the plant for producing the glass bodies (2) are used as much as possible refractory materials not containing $ZrO_2$. In this way, this compound is prevented from diffusing in an uncontrolled manner in the glass, making its composition dishomogeneous and, consequently, not ensuring the required aesthetic and thermal shock resistance properties. Another important provision guaranteeing a high degree of homogeneity of the glass is the use of cold top all electric melting furnaces.

Figure 4:
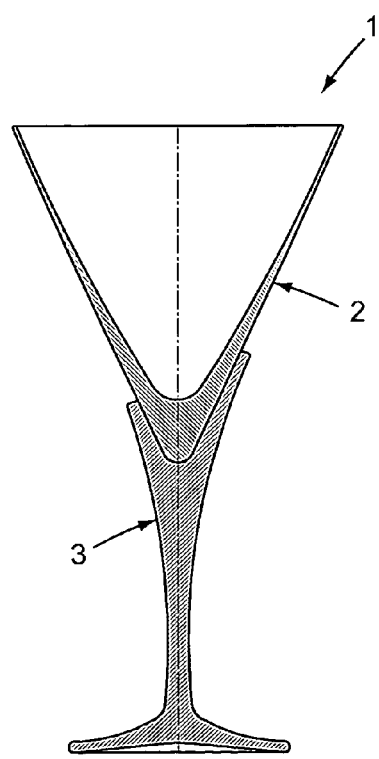
FIG. 4 shows a sectional view of an article made from overmoulded composite material in which the glass body is shaped like a goblet.
Figure 5:
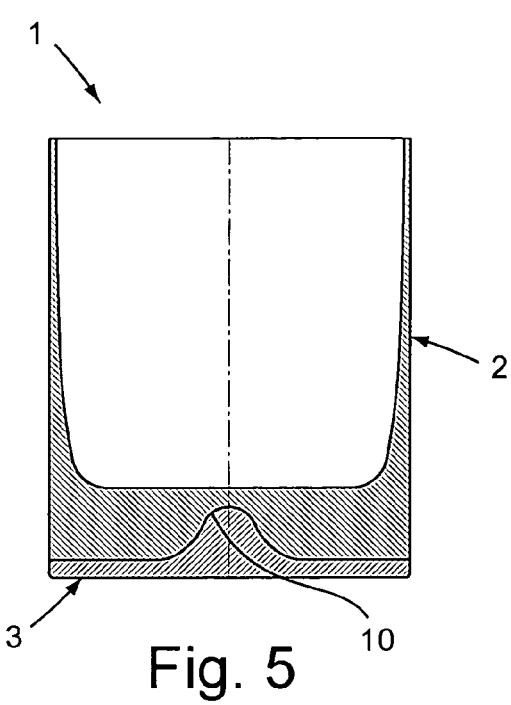
FIG. 5 shows a sectional view of an alternative embodiment of the article made from overmoulded composite material of FIG. 1.
Figure 6:
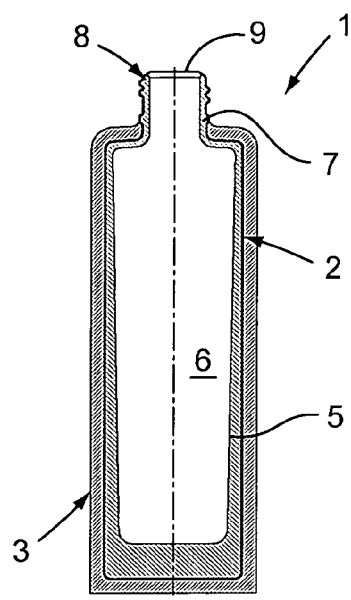
FIG. 6 shows a sectional view of an article made from overmoulded composite material in which the glass body is shaped like a bottle.
Figure 7:
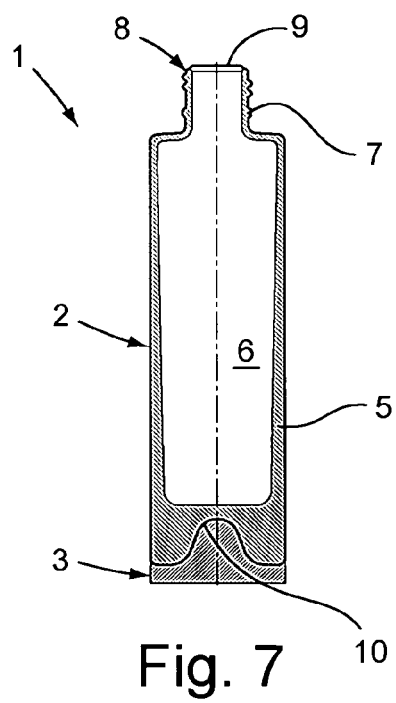
FIG. 7 shows a sectional view of an alternative embodiment of the article made from overmoulded composite material of FIG. 6.
Figure 8:
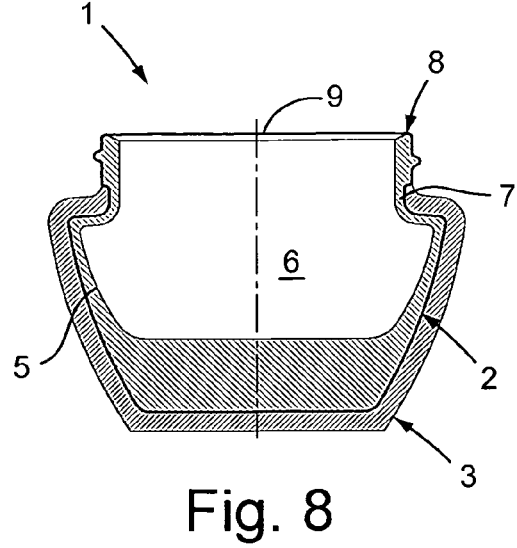
FIG. 8 shows a sectional view of an article made from overmoulded composite material in which the glass body is shaped like a jar.
Figure 13:
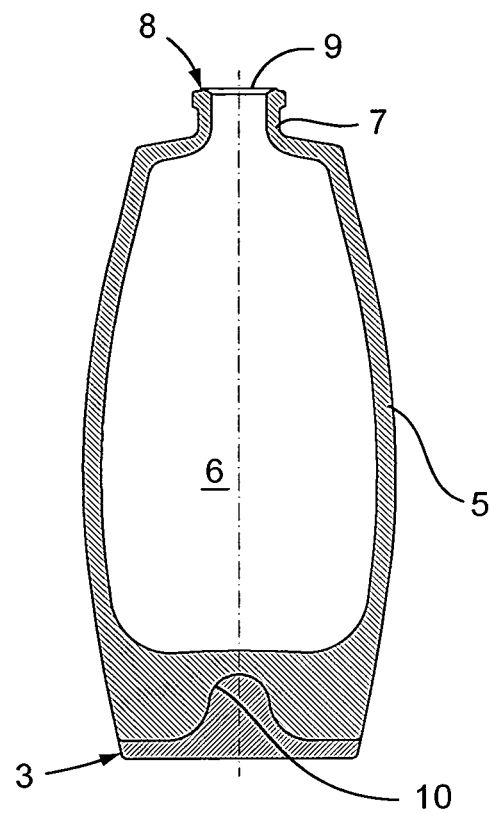
FIG. 13 shows a sectional view of an alternative embodiment of the article made from overmoulded composite material of FIG. 6.
Figure 14:
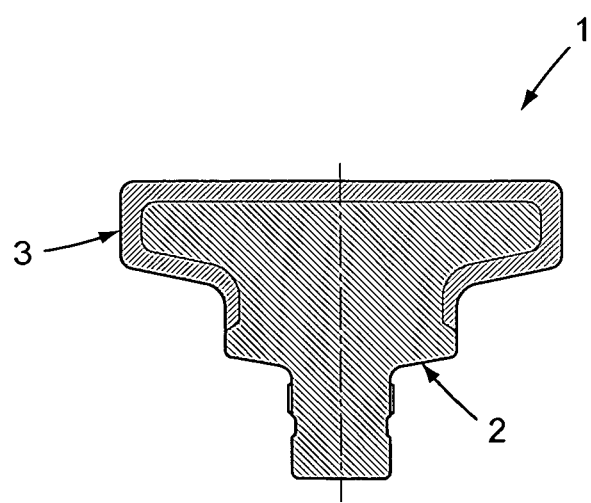
FIG. 14 shows a sectional view of an article made from overmoulded composite material in which the glass body is shaped like a stopper.

The figures attached to the present description show some examples of article made from overmoulded composite material in which the glass body (2) is in the form of a flask (FIGS. 6, 7), bottle (FIGS. 10-13), glass (FIGS. 1-3, 5), goblet (FIG. 4) and jar (FIGS. 8,9). FIG. 14 shows an article made from overmoulded composite material consisting of a stopper (FIG. 14) able to be associated with the overmoulded containers according to the present invention.

With reference to the figures, by the term bottle in the present description it is meant a glass body (2) comprising a recipient portion (5) that defines a containment chamber (6) from which a neck (7) extends, the distal end (8) of which, with respect to the recipient portion (5), comprises an opening (9); the neck (7) is pervious and places the containment chamber (6) in fluid communication with the opening (9) of the neck (7). In the present description the terms "jar" and "flask" should be understood as embodiments of a bottle according to the aforementioned definition.

The neck (7) can also comprise a threading to receive a threaded stopper (not shown in FIGS. 10-13 where solutions are represented with a smooth mouth).

The article made from overmoulded composite material object of the present invention comprises a jacket (3) that coats the glass body (2) totally or only partially. When the jacket (3) is total, the layer of overmoulded thermoplastic resin completely covers the outer surface of the glass body (2). When the jacket (3) is partial, only a fraction of the surface of the glass body (2) is coated by the layer of overmoulded resin.

Examples of totally overmoulded articles are represented in FIGS. 1, 2, 6, 8, 10 and 14. Examples of partially overmoulded articles are represented in FIGS. 3-5, 7, 9, 11-13.

The jacket (3) consists of a layer of resin overmoulded on the surface of the glass body (2). In a preferred embodiment, the jacket (3) is made with a transparent or semi-transparent resin that makes the shape of the glass body and/or its colour and/or its content visible from the outside (in the case of hollow glass bodies that act as containers). For the purposes of the present invention, the moulded resin is taken to be "transparent or semi-transparent" if from a UV-VIS spectrophotometric analysis in the range 380-1100 nm in transmittance, transmittance curves are obtained that have at least one peak, in the range of wavelengths analysed, of intensity greater than 10%.

The thickness of the jacket of resin in the article made from overmoulded composite material (1) can be substantially constant along the entire surface of the jacket (3) (as in the case of the articles of FIGS. 6, 8 and 14) or it can vary along it (for example, in the case of the articles of FIGS. 1-5, 7, 9-13).

The thickness of the outer jacket (3) typically varies from 1 mm up to 20 mm. Achieving such low thickness is made possible by the particular chemical composition of the glass according to the present invention that gives the glass body (2) high mechanical strength and resistance to thermal shocks. Thanks to such characteristics it is possible to overmould a jacket (2) consisting of a layer of resin having a minimum thickness equal to or even less than the minimum thickness of the glass body (2). As can be seen from FIG. 1, said thicknesses are meant to be measured at the point of contact of said portion of jacket with said glass body (for example, upper edge of the drinking glass).

The possibility of varying the thickness of the jacket (3) in a wide range and, in particular, the possibility of obtaining jackets (3) of lower thickness with respect to that of the jackets of overmoulded articles of the prior art makes it possible to make articles made from overmoulded composite material (1) in which the glass body (2) can be shaped as desired irrespective of the final shape that it is wished to obtain for the jacketed article. Moreover, by making jackets of variable shape and thickness and by varying the degree of transparency of the resin, it is possible to obtain optical effects of amplification and/or distortion of the visible image of the glass body and/or of its content. In this way the margin of creativity available for the design of articles of particular aesthetic effect is considerably widened.

The glass body (2), which can be coloured or transparent, can comprise a decorative element on the inner and/or outer surface. The decorative pattern (for example a ceramic or metallic decoration) is made on the glass body (2) with the techniques known in the prior art before it is subjected to overmoulding. The decorative element can also be applied to the outer surface of the jacket (3) made from thermoplastic resin.

Since in accordance with the present invention the thickness of the glass of the glass body (2) can also be varied as desired within a wide range, typically from 1.5 mm to 10 mm, it is possible to prepare articles made from overmoulded composite material (1) suitable for use as containers for packaging perfumes and cosmetic products. In particular, it is possible to prepare article made from overmoulded composite material having a comparable weight to that of glass containers typically used in the field for the same purpose. As stated, the weight of the container contributes significantly to the perception of value of the product for the end user.

The protection offered by the jacket (3) made from resin also gives the article made from overmoulded composite material (1) a high degree of protection against impacts, also avoiding the scattering of fragments in the case of breaking.

The resins able to be used for the overmoulding of the jacket (3) belong to the group of thermoplastic or thermosetting resins, such as olefin, polyurethane, polyethylene and polystyrene resins.

In a particularly preferred embodiment, the resin is a thermoplastic resin of the ionomer type consisting of an ethylene copolymer/methacrylic acid or ethylene/acrylic acid, in which the acid groups of the methacrylic or acrylic acid are partially neutralized by sodium ions. This resin is available on the market going by the trade name Surlyn® (DuPont™).

This kind of resin makes it possible to obtain particularly pleasant and captivating aesthetic effects, thanks to the high degree of transparency and clearness that jackets made with this type of resin possess.

The use of this specific resin also gives the overmoulded articles high resistance to abrasion, making the outer surface of the end product extremely scratch-resistant. Moreover, the surface of the jacket (3) made with this resin is characterised by a particular degree of repellence against organic deposits, such as skin grease, thus giving the outer surface of the article made from overmoulded composite material (1) an additional anti-fingerprint functionality.

The articles made from composite material (1) having the glass body (2) made with the glass according to the present invention and overmoulded with the ionomer thermoplastic resins of the Surlyn® type are particularly suitable for use as containers in the field of perfume.

The specific combination of these two materials makes it possible to obtain articles made from glass/resin overmoulded composite material characterised by original and unique aesthetic effects, which otherwise cannot be made. Moreover the aesthetic aspect is combined with functional properties, such as impact resistance, resistance to abrasion, resistance to the deposit of fingerprints and weight. Moreover, the presence of the glass container ensures the possibility of prolonged contact with alcoholic solutions and foods without the risk of degradation of the container or releasing components to its content.

Moreover, when the aforementioned ionomer resins, in particular those of the Surlyn type, are overmoulded on a glass of the "Ultra Clear" type (in accordance with standard ISO/PAS IWA 8:2009) the particular effect of enhancing the feeling of depth deriving from the modelling of the glass body (2) with respect to the surrounding mass of resin that forms the jacket (3) is obtained, thanks to the fact the resin and the glass have very similar optical parameters of lightness (L) and chroma (C), in particular $L>0.98$ and $C<0.5$ for both. When these optical parameters substantially differ between glass and resin, the inner glass body is visible as a well-defined object inside the resin and distinct from it. When the parameters have very close values, the article made from overmoulded composite material is, on the other hand, perceived by the eye of the person observing it as a single body.

The articles made from overmoulded composite material (1) object of the present invention can be prepared using the processes of overmoulding thermoplastic resins on glass (or other materials) known in the state of the art.

The Applicant, however, has developed a method particularly suitable for preparing the articles object of the invention in which glass having the composition described earlier is used.

The method for preparing the articles (1) made from overmoulded composite material according to the present invention comprises a step of positioning the glass body (2) that it is wished to overmould in the cavity of a metallic mould.

The metallic mould generally consists of two half-moulds that define the final shape of the overmoulded article.

Once the glass body (2) is positioned, the thermoplastic resin is injected into the mould in fluid state, which fills the volume of the cavity of the mould not occupied by the glass body.

After the injection of the resin, one waits for the resin to solidify forming the jacket (3). The cooling can be completed inside the mould or the overmoulded article can be taken from the mould and transferred still hot to an air or water-cooled cooling system; cooling outside the mould is the preferred solution, since it allows the overmoulding process to be sped up significantly, increasing its productivity.

In general, in injection overmoulding processes the quality of the jacket depends, amongst other parameters, on the ease with which the resin can flow inside the mould and completely fill, in a homogeneous manner, the available volume. The fluidity of the resin, in turn, depends on the temperature at which it is injected into the mould.

As stated, thanks to the particular chemical composition, the glass body (2) used for the purposes of the present invention possess a high resistance to thermal shocks. This property allows the glass to come into contact with resins having higher temperatures than those generally used in the processes of the state of the art, without suffering damage. As well as the temperature, the slipperiness of the surface is a relevant factor to facilitate the injection process. The slipperiness can be increased by subjecting the glass to surface treatments, as specified hereafter.

In accordance with the present invention, the resin is injected into the mould at a temperature equal to or greater than 170° C., preferably within the range 170° C.-220° C. (temperature measured at the injector).

At the aforementioned temperature conditions, the injection pressure of the resin can be kept equal to or less than 60 bars (corresponding to 600 bars on the surface of the glass body), preferably within the range 10-40 bars.

The aforementioned temperature and pressure conditions make it possible to obtain jackets even of low thickness, which cannot be obtained with the processes known in the prior art.

Before being subjected to moulding, the glass bodies can be subjected to surface finishing treatments of the mechanical type (for example grinding), or of the chemical type (application of functional or decorative coatings).

In a preferred embodiment, the glass body (2) is subjected to a coloured lacquering treatment.

In the case of glass containers, the lacquering is generally applied on the outer surface that does not come into contact with the content. The lacquering, however, can also be applied on the inner surface of the container. In such a case, the lacquering must have a further protective layer applied on it to ensure that there is no undesired release of substances to the product with which it will come into contact. With the overmoulding method on coloured glass an aesthetic effect analogous to that of internal lacquering is obtained, without however any need for protective layers.

The possibility of making a jacket (3) on glass bodies (2) that have been previously coloured or otherwise treated makes it possible to prepare different products even in small batches.

The particular composition of the glass used in the method object of the present invention also promotes the overmoulding of glass bodies (2), in particular containers also having corners or geometric shapes that significantly differ from that of solids of revolution.

In the case of overmoulding of bottles, with the method of the present invention the best results in terms of reproducibility and amount of waste are observed when the minimum radius of all of the corners is 0.3 mm and the minimum thickness of the walls is 1.5 mm.

In order to limit the risk of breaking during the overmoulding of the glass bodies (2) it is preferable to shape the glass body (2) so that it has a concavity (10) on the bottom (FIGS. 5, 7, 9, 12 and 13), to be filled with the thermoplastic resin.

By injecting the resin in the mould from the side of the glass body in which the concavity (9) is formed, a thrust is caused on the glass body (2), which is thus forced to adhere to the opposite wall of the mould. With such a provision, moreover, the resin injected into the mould flows symmetrically around the container, reducing the mechanical stresses on the glass body (2) to the minimum.

In order to further reduce the risks of the glass breaking during injection it is preferable to apply to the surface of the glass bodies (2) to be overmoulded an organic polymeric coating (for example aqueous solutions of polyethylene, oleic acid or other tribological compounds), which reduces the friction of the resin on the glass. The reduction in friction also makes it possible to inject the resin at lower pressures, thus producing articles with low thickness jackets. A further advantage is that of increasing the overall production speed of the articles made from overmoulded composite material.

The application of organic coating layers also promotes the slipperiness of the glass bodies during their handling in the production lines, where the glass-on-glass contact can cause surface micro-fractures that weaken the glass and make it more susceptible to breaking in the subsequent processing steps.

The contact between the surface of the glass body and that of the metallic mould is a determinant factor of the risk of the glass breaking during the injection step.

In order to reduce such a risk and ensure optimal closing of the mould around the glass body to be overmoulded, the points of the metallic mould that come into contact with the glass body (for example the neck of the bottle) are preferably coated with inserts of an elastomeric plastic material, which mitigates the rubbing of the glass on the metal, also allowing a certain (minimum) mobility of the glass body during the injection of the resin.

In a preferred embodiment, the method of the present invention provides the cooling and/or heating of the mould separately and independently from that of the injection system of the resin. This provision makes it possible to keep the mould at a low temperature and, at the same time, the injection channel at a high temperature. The low temperature of the mould makes it possible to obtain a good surface finish of the jacket, whereas keeping the injection duct at a high temperature makes it possible to inject, if necessary, further resin inside the mould, for example to compensate for the decrease in volume of the resin that occurs during the cooling and solidification step of the resin.

In an alternative embodiment, the compensation for the decrease in volume of the resin can be obtained by creating a chamber of suitable volume in the injection duct upstream of the mould. The volume of the chamber depends on the extent of the decrease in volume due to the shrinkage of the resin that, in turn, substantially depends on the volume of the areas of maximum thickness of the resin on the glass body. The presence of the chamber ensures that during cooling the shrinkage of the resin is concentrated right inside the chamber and not in the cavity of the mould.

From the advantages outlined above, it can be seen that the method object of the present invention is faster, more flexible and more reproducible than the method known in the state of the art. In particular, the method according to the present invention produces a smaller amount of production waste, being carried out in conditions that reduce the risk of breaking of the glass bodies during overmoulding.

The following example embodiment is provided merely for the purpose of illustrating the present invention and it must not be taken to limit the scope of protection defined by the attached claims.

EXAMPLE 1

A flask made from overmoulded composite material in accordance with the present invention was prepared by overmoulding of a jacket of resin on a sodium-calcium glass flask comprising (percentages in weight referring to the weight of the glass): CaO 9.5%, MgO 1.5%, $Al_2O_3$ 2% and ZnO 0.6%.

Before overmoulding, the flask was treated with a liquid composition containing polyethylene.

For the jacket an ionomer resin was used consisting of an ethylene copolymer/methacrylic acid, having a part of the acid groups of the methacrylic acid partially neutralized by sodium ions (commercial product Surlyn® 8670FP).

The resin was injected at a temperature of 170° C. and a pressure of 60 bars.

Thanks to the particular composition of the glass it was possible to overmould onto the glass body a jacket having the following distribution of thicknesses:
minimum thickness of the glass equal to 2.5 mm;
minimum thickness of the resin equal to 2 mm;
maximum thickness of the glass equal to 3 mm;
maximum thickness of the resin equal to 9 mm.

The aforementioned distribution of thicknesses is the result of the specific glass/resin combination of the present invention.

EXAMPLE 2

The resin of Example 1 was overmoulded on flasks made with two types of glass having different chemical composition: a sodium-calcium glass (V(SC)) according to the state of the art and an Ultra Clear glass type according to the present invention (V(I)). The chemical composition of the glass types V(SC) and V(I) used is given in the following table (percentages in weight referring to the weight of the glass):

| Oxides | V(SC) % by weight | V(I) % by weight |
|---|---|---|
| $SiO_2$ | 71.68 | 71.62 |
| $Na_2O$ | 14.05 | 14.07 |
| $B_2O_3$ | 0.00 | 0.00 |
| $K_2O$ | 0.01 | 0.01 |
| CaO | 9.80 | 9.80 |
| MgO | 2.19 | 1.68 |
| ZnO | 0.00 | 0.51 |
| $Al_2O_3$ | 1.97 | 1.98 |
| BaO | 0.00 | 0.00 |
| $Fe_2O_3$ | 0.01 | 0.01 |
| $SO_3$ | 0.24 | 0.23 |

The overmoulded flask has the following characteristics:
thickness of the glass variable within the range 2.7-3.5 mm,
thickness of the resin jacket variable within the range 2-9 mm,
in the central area of the flask the thickness of the jacket (2 mm) is less than that of the glass (2.7 mm),
overall volume 96.4 cc (capacity 30 ml).

Before overmoulding, carried out with an injection machine (NEGRI-BOSSI), the outer surface of the flask was treated with a liquid composition containing polyethylene.

Keeping all the other operating conditions the same, the overmoulding method with the two glass types displayed the differences given in the following table:

| | V(SC) | V(I) |
|---|---|---|
| minimum injection time | 79 sec | 53 sec |
| maximum pressure up to breaking | 46 bars | 60 bars |
| maximum temperature of injection up to breaking | 180° C. | 200° C. |
| % waste in normal operating conditions | 18% | 2% |
| Hourly productivity in normal operation (pieces/hour) | 33 | 66 |

The invention claimed is:

1. Article made of overmoulded composite material (1) comprising a glass body (2) and an overmoulded jacket (3) made of thermoplastic resin, characterised in that said glass (2) is a sodium-calcium glass comprising (percentages in weight referring to the weight of the glass):
CaO from 8 to 10% in weight;
$Al_2O_3$ from 1 to 2% in weight;
one or more oxides selected from among the group consisting of ZnO, $TiO_2$ and $ZrO_2$, at an amount ranging from 0.3 to 3% in weight of each oxide.

2. Article (1) according to claim 1, characterised in that ZnO is present at an amount ranging between 0.5% and 2% in weight and/or $TiO_2$ is present at an amount ranging between 0.5% and 2% and/or $ZrO_2$ is present at an amount ranging between 0.3% and 1%.

3. Article (1) according to claim 1, characterised in that it comprises $B_2O_3$
from 1 to 3% in weight.

4. Article (1) according to claim 1, characterised in that it comprises MgO
from 1 to 5% in weight.

5. Article (1) according to claim 1, characterized in that it comprises MgO from 1 to 3% in weight.

6. Article (1) according to claim 1, characterised in that said thermoplastic resin is an ionomer resin consisting of an ethylene copolymer/methacrylic acid or ethylene/acrylic acid, wherein the acid groups of said methacrylic acid or acrylic acid are at least partially neutralized by sodium ions.

7. Article (1) according to claim 1, characterised in that said glass has an iron oxides content lower than 140 ppm.

8. Article according to claim 1, characterised in that said glass body (2) comprises a decorative element.

9. Article according to claim 1, characterised in that said glass body (2) is coloured.

10. Article (1) according to claim 1, characterised in that said thermoplastic resin is transparent or semi-transparent.

11. Article (1) according to claim 1 wherein at least a portion of said jacket (3) has a smaller thickness than the thickness of said glass body (2), said thickness being measured at the point of contact of said portion of jacket with said glass body.

12. Method for making an article made of overmoulded composite material (1) according to claim 1 comprising a glass body (2) and an overmoulded jacket (3) made of thermoplastic resin, said method comprising the following steps:
 a) positioning said glass body (2) in a cavity of a mould;
 b) injecting a thermoplastic resin into said mould.

13. Method according to claim 12, characterised in that said resin is injected into said mould at a temperature equal to or higher than 170° C.

14. Method according to claim 12, characterized in that said resin is injected into said mould at a temperature between 170° C.-220° C.

15. Method according to claim 12, characterised in that said resin is injected into said mould at a pressure equal to or lower than 60 bars.

16. Method according to claim 12, characterized in that said resin is injected into said mould at a pressure between 10-40 bars.

17. Method according to claim 12, characterised in that said glass body (2) is previously subjected to a surface treatment for applying a coating based on difluoroethane or aluminium trichloride or tin chlorides or a hot sulfuration treatment.

18. Method according to claim 12, characterised in that said glass body (2) is previously subjected to a surface treatment for applying an organic polymer coating with aqueous solutions of polyethylene or oleic acid.

* * * * *